July 6, 1943.                G. E. FRANCK                2,323,531
                            DIAPHRAGM VALVE
                          Filed Sept. 8, 1941
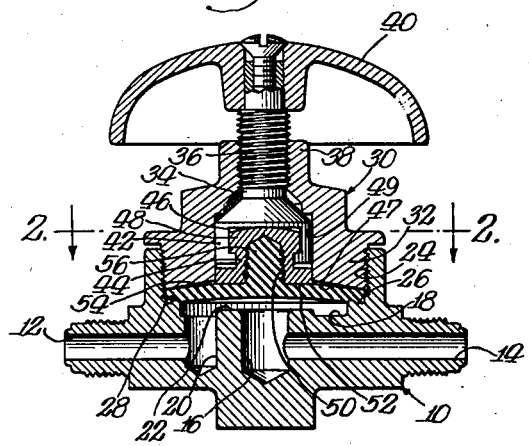
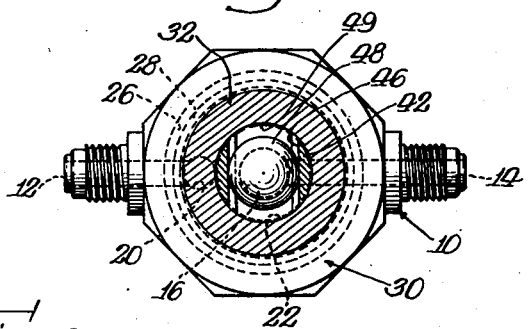
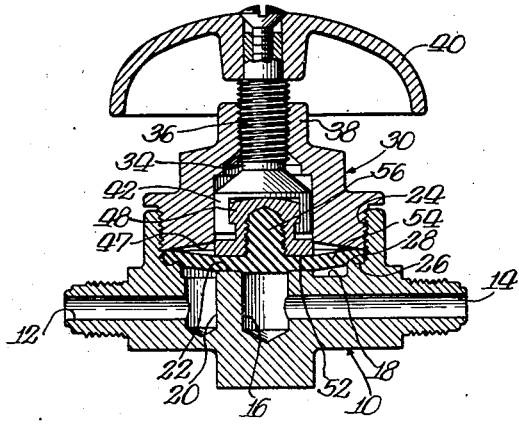
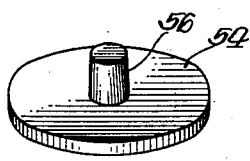
INVENTOR.
George E. Franck,
BY Bair & Freeman
          Attys.

Patented July 6, 1943

2,323,531

UNITED STATES PATENT OFFICE 2,323,531

DIAPHRAGM VALVE

George E. Franck, Riverside, Ill., assignor to The Imperial Brass Manufacturing Company, Chicago, Ill., a corporation of Illinois Application September 8, 1941, Serial No. 409,968

2 Claims. (Cl. 251—24)

My invention relates to diaphragm valves and particularly shut-off valves for liquid lines.

Among the objects of my invention is to provide a new and improved shut-off valve device which incorporates in it a valve diaphragm of non-metallic material which is easy to install and requires relatively few operations to remove and replace after it has become worn.

Another object of my device is to provide a new and improved non-metallic disk valve and mounting therefor wherein the anchoring connection between the valve disk and the mounting is formed when the parts are joined together.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a longitudinal sectional view of my device, with the valve open.

Figure 2 is a cross-sectional view on the line 2—2 of Figure 1.

Figure 3 is a longitudinal sectional view similar to Figure 1, with the valve in seated position rather than open.

Figure 4 is a perspective view of the non-metallic valve disk.

While disk valves are not new in the art, and even non-metallic disk valves, the manner of employing non-metallic valve disks in the past has largely been to perforate the valve disk and apply to it some connecting device, usually metallic, in order to anchor the center of the valve to a valve operating mechanism where it has been necessary to actually manipulate the central portion of the valve in order to effect seating and unseating. Disk valves of non-metallic material, although of relatively tough consistency, need somewhat special treatment in mounting them so that they will be firmly held without damaging the material forming the valve disk, and also mounting them in such a manner that no undue flexure is present where the strain on the valve is at its greatest.

In the embodiment selected for the purpose of illustrating my invention I have provided a valve body 10 having an inlet passage 12 and an outlet passage 14. A centrally disposed recess 16 is vertically disposed within the valve body and connected to the outlet passage. Likewise, in the valve body is an annular recess 18 surrounding and concentric with the centrally disposed recess and connected to the inlet passage by means of a short passage 20. An annular valve seat 22, having a relatively flat upper surface, separates the central recess from the annular recess surrounding it.

In the valve body is a threaded opening 24 on the upper side adjacent the valve seat. At the bottom of the threaded opening is a shoulder 26 at the outer circumference thereof, and on the shoulder is a raised annular bead 28 spaced a short distance inwardly from the outermost rim.

A valve bonnet 30 has a threaded portion 32 extending downwardly and threadedly engaged within the opening 24 of the valve body. Within the bonnet there is mounted a valve stem 34 having a threaded shank 36 extendable into and out of a threaded neck 38 on the bonnet. A valve handle 40 of the customary sort is provided on the outside end of the stem.

Within the bonnet the valve stem is provided with an enlargement 42 to which is attached a foot-piece 44. The enlargement is provided with an anchoring recess 46 which is designed to hold a flange 48 on the foot-piece. As shown in Figure 2, the anchoring recess 46 extends across the enlargement from one side to the other, so that when the stem is screwed downwardly on the bonnet until the enlargement protrudes below the lower side thereof, the foot-piece can be inserted into the anchoring recess from the side.

The bonnet is likewise provided with a lower concave face 47 and a central pocket 49. The pocket 49 is large enough so that the enlargement 42 on the valve stem and the foot-piece 44 can slide freely up and down within it.

The foot-piece, in turn, has a central threaded recess 50 and an annular pressure plate 52 surrounding and concentric with the recess. The pressure plate, it will be observed, has a relatively flat face diametrically opposite the flat annular valve seat 22.

The diaphragm valve element 54 shown in Figure 4 consists of a non-metallic material which is resilient, and having relatively great tensile strength. The disk portion of the valve may be laminated with fabric, if desired. On the top of the disk is a boss 56 which may be substantially cylindrical in form, having smooth sides and integral with the disk portion of the valve. The boss and the disk, of course, are made of the same material.

When the disk valve is attached to the foot-piece, the boss is threaded into the threaded recess 50, the threads within the recess pressing their way into the boss until the valve disk is firmly anchored in the foot-piece.

In assembling the device the non-metallic valve disk is first anchored to the foot-piece by this threading operation, and the foot-piece inserted in the enlargement on the stem. The parts thus assembled are then drawn into the pocket in the bonnet and the bonnet screwed into place in the threaded opening on the body. The bonnet is forced with sufficient pressure into the opening so that the outer rim of the face of the bonnet presses the outer circumference of the valve disk into intimate contact with the shoulder and the raised bead in the body portion.

In inoperative position the valve disk will appear as shown in Figure 1, the central portion of the disk being raised from the valve seat by unscrewing the valve stem. When it is desired to close the valve the handle and stem are turned clockwise, and the enlargement rotates relatively to the foot-piece. As the stem moves downwardly it presses the foot-piece downwardly, and the pressure face on the foot-piece is urged against the valve disk, pressing it tightly against the annular valve seat.

It will be apparent that the movement of the valve disk is positive and depends upon the positioning of the valve stem. The opening of the valve is not dependent upon any inherent resiliency in the valve disk.

There has thus been provided a simplified disk valve structure which incorporates a positive mounting for a non-metallic disk valve, a portion of which forms the anchoring means for fastening the disk valve to the valve stem.

I claim as my invention:

1. A diaphragm valve comprising a valve body having an inlet passage, an outlet passage, a centrally disposed recess joining one of said passages, an annular concentric recess joining the other of said passages and a flat, relatively wide annular valve seat separating said recesses, said body having an opening on the side adjacent the valve seat, a shoulder at the bottom of said opening adjacent the outside circumference thereof and a raised bead on said shoulder spaced inwardly from the outside circumference, a bonnet for the valve having a portion fitting into said opening, a relatively flat outer rim on said portion above and adjacent said combined shoulder and bead, a concave face and a pocket centrically disposed relative to said face, a valve in said pocket comprising a stem, a handle on the stem, a foot-piece on the stem within said pocket having a central threaded recess and a flat annular pressure face surrounding the recess located above the valve seat, a diaphragm of non-metallic resilient material of substantial thickness having normally flat faces at the outer edges thereof sealed between the combined shoulder and raised bead in the valve body and the outer rim of the bonnet, said bead being impressed into one of said normally flat faces, and an initially smooth-sided substantially cylindrical boss of non-metallic material integral with the upper side of said disk and compressed between the threads in the recess of said foot-piece for anchoring the disk to the foot-piece, said disk having an annular seat contacting portion between the annular pressure face and the valve seat.

2. In a valve device, a valve body having a chamber, a centrally disposed port in said chamber, a flat relatively wide valve seat surrounding said port and a second port outside the perimeter of said valve seat, a bonnet for the valve closing one side of the chamber having a central opening therein and a valve mounting centrally disposed in the bonnet, said mounting comprising a valve stem, a handle and a foot-piece on the stem having a recess therein closed at the bottom and larger in diameter at the open end than at the bottom, said recess having threads in the walls thereof and said foot-piece having a relatively flat area surrounding the recess positioned opposite and parallel to and spaced normally a short distance laterally from the valve seat, and a valve of non-metallic material having a disc overlying the flat area of the foot-piece and extending therebeyond, an integral boss of the same non-metallic material on the face of said disc adjacent the recess having the outer end smaller in diameter than the end adjacent said disc, said boss having initially smooth sides and in assembled condition being in engagement with the threads of the recess and extended thereinto to a position wherein the boss is compressed within the threaded recess and the disc is firmly pressed against the flange between the flange and the valve seat.

GEORGE E. FRANCK.